(12) United States Patent
Aso et al.

(10) Patent No.: US 11,817,740 B2
(45) Date of Patent: Nov. 14, 2023

(54) ELECTRIC MOTOR, AIR CONDITIONER, AND METHOD FOR PRODUCING ELECTRIC MOTOR

(71) Applicant: Mitsubishi Electric Corporation, Tokyo (JP)

(72) Inventors: Hiroki Aso, Tokyo (JP); Takaya Shimokawa, Tokyo (JP); Ryogo Takahashi, Tokyo (JP); Takanori Watanabe, Tokyo (JP); Kazuma Nomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/461,412

(22) PCT Filed: Jan. 20, 2017

(86) PCT No.: PCT/JP2017/001865
§ 371 (c)(1),
(2) Date: May 16, 2019

(87) PCT Pub. No.: WO2018/134959
PCT Pub. Date: Jul. 26, 2018

(65) Prior Publication Data
US 2019/0348892 A1 Nov. 14, 2019

(51) Int. Cl.
*H02K 1/14* (2006.01)
*H02K 1/18* (2006.01)
*H02K 15/12* (2006.01)
*H02K 21/16* (2006.01)
*H02K 9/22* (2006.01)
*F24F 1/20* (2011.01)

(52) U.S. Cl.
CPC ............... *H02K 1/146* (2013.01); *F24F 1/20* (2013.01); *H02K 1/185* (2013.01); *H02K 9/227* (2021.01); *H02K 15/12* (2013.01); *H02K 21/16* (2013.01)

(58) Field of Classification Search
CPC .............................. H02K 15/12; H02K 21/12
USPC ............................................... 310/43, 64, 66
See application file for complete search history.

(56) References Cited

U.S. PATENT DOCUMENTS 8,376,072 B2    2/2013  Sagara et al.
8,395,289 B2 *  3/2013  Tian ......................... H02K 9/06
                                                    310/64
2009/0179510 A1 *  7/2009  Yoshida ................. H02K 11/05
                                                    310/68 D (Continued)

FOREIGN PATENT DOCUMENTS

CN    201349153 Y    11/2009
CN    101771298 A    7/2010

(Continued)

OTHER PUBLICATIONS

Machine Translation WO2018107501 (Year: 2018).*

(Continued)

*Primary Examiner* — Jose A Gonzalez Quinones
(74) *Attorney, Agent, or Firm* — POSZ LAW GROUP, PLC

(57) ABSTRACT

An electric motor includes a rotor, a stator assembly, and a plurality of heat dissipation members fixed to the stator assembly and to release heat of the stator assembly.

20 Claims, 14 Drawing Sheets

(56) References Cited

U.S. PATENT DOCUMENTS

| | | | | |
|---|---|---|---|---|
| 2010/0163320 | A1* | 7/2010 | Sagara | H02K 5/08 |
| | | | | 180/65.1 |
| 2011/0234028 | A1* | 9/2011 | Iwasaki | H02K 9/223 |
| | | | | 310/52 |
| 2012/0025746 | A1* | 2/2012 | Kawakubo | H02K 11/33 |
| | | | | 29/596 |
| 2012/0091573 | A1* | 4/2012 | Sasaki | H01L 23/473 |
| | | | | 257/E23.08 |
| 2013/0328424 | A1 | 12/2013 | Goto | |
| 2014/0332194 | A1 | 11/2014 | Durland et al. | |
| 2016/0149472 | A1* | 5/2016 | Pal | H02K 9/227 |
| | | | | 310/64 |
| 2017/0167480 | A1 | 6/2017 | Kim et al. | |

FOREIGN PATENT DOCUMENTS

| | | | |
|---|---|---|---|
| CN | 105379085 A | | 3/2016 |
| CN | 105637219 A | | 6/2016 |
| EP | 2863515 A1 | | 4/2015 |
| JP | S57-065570 | | 4/1982 |
| JP | H04-150746 A | | 5/1992 |
| JP | 04312337 | * | 11/1992 |
| JP | H07-007882 A | | 1/1995 |
| JP | H09-009575 A | | 1/1997 |
| JP | H10-051989 A | | 2/1998 |
| JP | H1098853 A | * | 4/1998 |
| JP | 2001186706 A | * | 7/2001 |
| JP | 2002-017066 A | | 1/2002 |
| JP | 2002223553 A | * | 8/2002 |
| JP | 2007-228667 A | | 9/2007 |
| JP | 2008-160033 A | | 7/2008 |
| JP | 2008178190 A | * | 7/2008 |
| JP | 2009-131127 A | | 6/2009 |
| JP | 2009131127 A | * | 6/2009 |
| JP | 2010093962 A | * | 4/2010 |
| WO | 2010/122642 A1 | | 10/2010 |
| WO | 2016/057558 A1 | | 4/2016 |
| WO | WO-2018107501 A1 | * | 6/2018 ......... F28D 15/0275 |

OTHER PUBLICATIONS

Office Action dated Jan. 16, 2020 issued in corresponding KR patent application No. 10-2019-7013772 (and English translation).
Extended European Search Report dated Oct. 28, 2019 issued in corresponding EP patent application No. 17893389.1.
International Search Report of the International Searching Authority dated Apr. 25, 2017 for the corresponding International application No. PCT/JP2017/001865 (and English translation).
Office Action dated Jan. 14, 2020 issued in corresponding JP patent application No. 2018-562819 (and English translation).
Office Action dated Apr. 29, 2020 issued in corresponding EP patent application No. 17893389.1.
Office Action dated Jul. 28, 2020 in connection with counterpart Korean Patent Application No. 10-2019-7013772 and a machine English translation.
Office Action dated Aug. 3, 2020 in connection with counterpart Chinese Patent Application No. 201780078524.4 and a machine English translation.
Chinese Office Action dated Mar. 31, 2021, issued in corresponding Chinese Patent Application No. 201780078524.4 (and English Machine Translation).
Office Action dated Sep. 22, 2021 in connection with counterpart Chinese Patent Application No. 201780078524.4 (and Machine English Translation).
Office Action dated May 27, 2022 in connection with counterpart Chinese Patent Application No. 201780078524. 4 (with machine English translation).
Office Action dated Oct. 10, 2022 issued in corresponding CN patent application No. 201780078524. 4 (and English machine translation).
Office Action dated Jan. 16, 2023 issued in corresponding CN patent application No. 201780078524.4 (and English machine translation).

* cited by examiner

ELECTRIC MOTOR, AIR CONDITIONER, AND METHOD FOR PRODUCING ELECTRIC MOTOR

CROSS REFERENCE TO RELATED APPLICATION

This application is a U.S. national stage application of International Patent Application No. PCT/JP2017/001865 filed on Jan. 20, 2017, the disclosure of which is incorporated herein by reference.

TECHNICAL FIELD

The present invention relates to an electric motor including a heat dissipation member.

BACKGROUND ART

To release heat from an electric motor to the outside, a heat sink is generally used as a heat dissipation member. For example, an electric motor in which a circular heat sink is attached to an end in an axial direction is proposed (see, for example, Patent Reference 1).

PATENT REFERENCE

Patent Reference 1: Japanese Patent Application Publication No. 2009-131127

In the conventional electric motor, however, since the one circular heat sink is attached to the end in the axial direction of the electric motor, efficient heat dissipation performance in consideration of a structure of the electric motor cannot be obtained. In addition, the size of the one heat sink is substantially equal to the diameter of the electric motor, and thus production costs of the heat sink increase.

SUMMARY

It is therefore an object of the present invention to enhance heat dissipation performance of an electric motor with a heat sink fabricated at low cost.

An electric motor according to the present invention includes: a rotor; a plurality of heat dissipation members; and a stator assembly including a resin fixing the plurality of heat dissipation members.

According to the present invention, heat dissipation performance of an electric motor can be enhanced.

DETAILED DESCRIPTION

First Embodiment

An electric motor 1 according to a first embodiment of the present invention will be described hereinafter.

In an xyz orthogonal coordinate system shown in each diagram, a z-axis direction (z axis) represents a direction parallel to an axis A1 (rotation center) of a shaft 22 of the electric motor 1 (hereinafter also referred to as an "axial direction"), an x-axis direction (x axis) represents a direction orthogonal to the z-axis direction (z axis), and a y-axis direction represents a direction orthogonal to both the z-axis direction and the x-axis direction.

Figure 1:
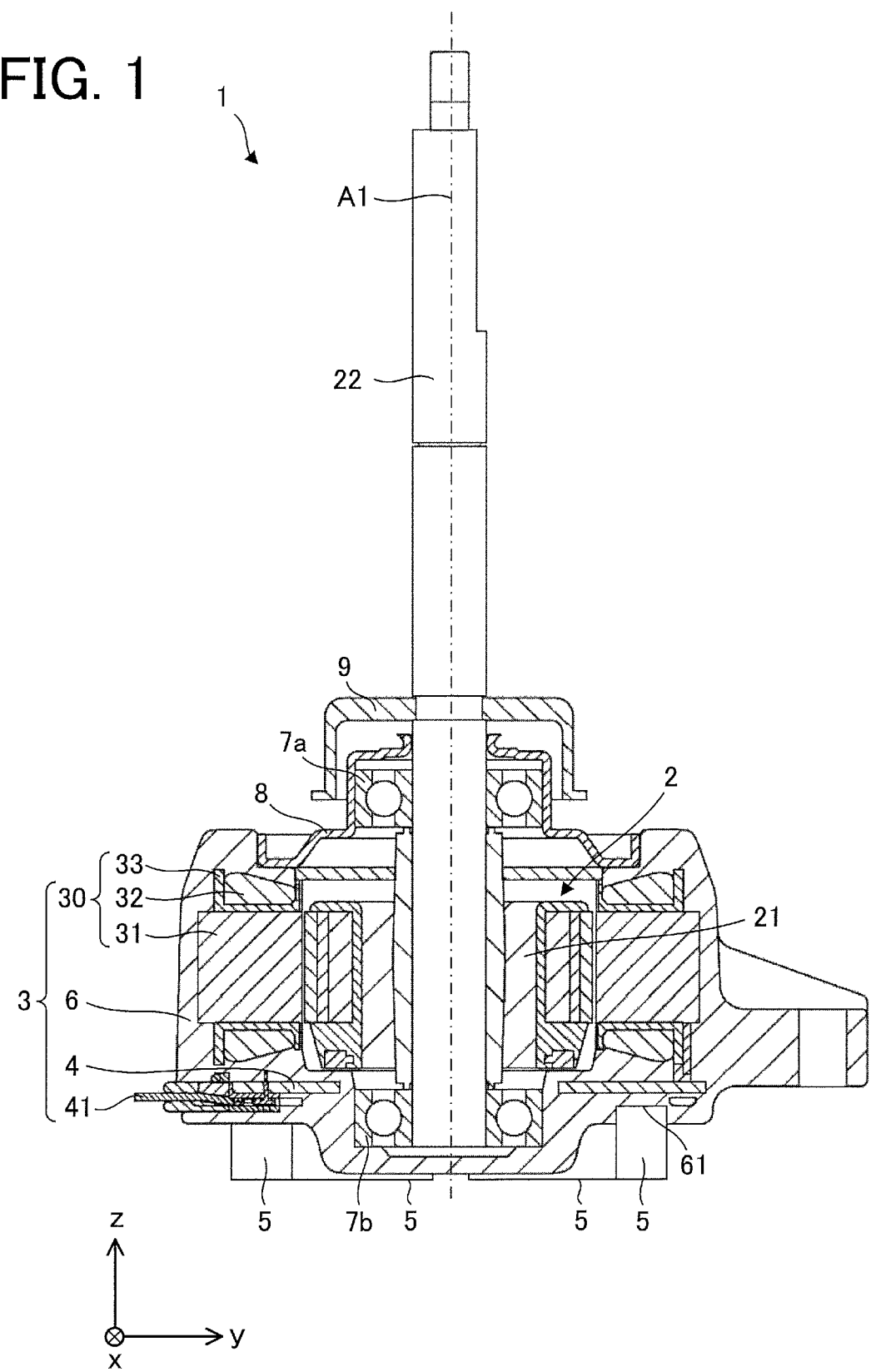
FIG. 1 is a cross-sectional view schematically illustrating a structure of an electric motor according to a first embodiment of the present invention.

FIG. 1 is a cross-sectional view schematically illustrating a structure of the electric motor 1 according to the first embodiment of the present invention.

Figure 2:
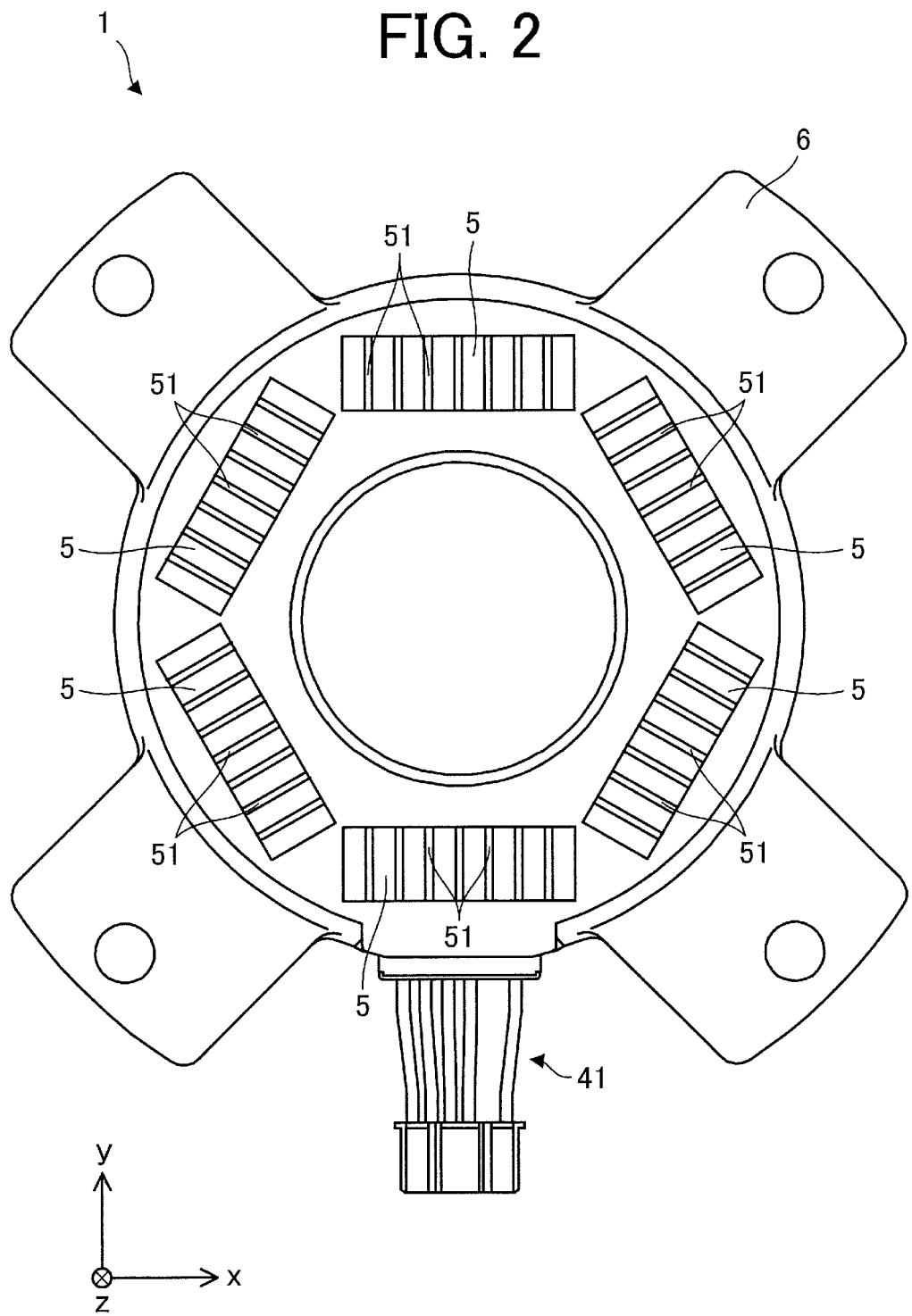
FIG. 2 is a front view schematically illustrating the structure of the electric motor.

FIG. 2 is a front view schematically illustrating the structure of the electric motor 1.

Figure 3:
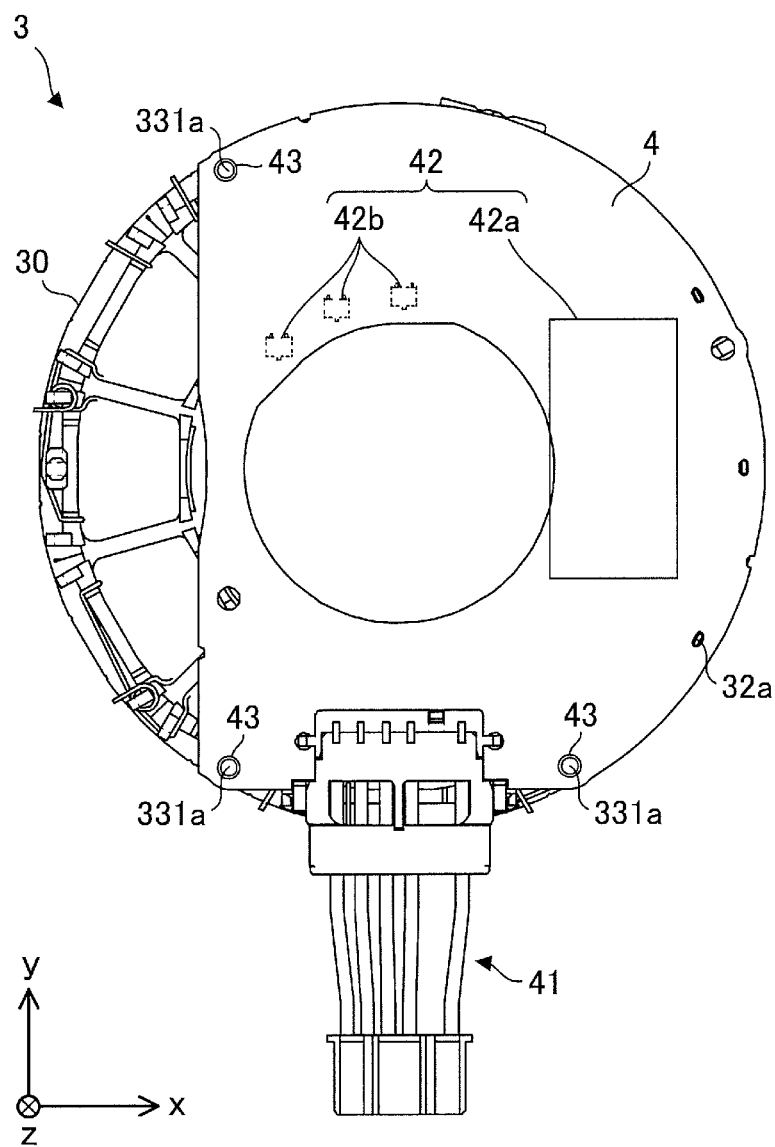
FIG. 3 is a front view schematically illustrating a structure of a stator assembly.

FIG. 3 is a front view schematically illustrating a structure of a stator assembly 3. The stator assembly 3 illustrated in FIG. 3 is in a state where a resin 6 is not attached.

The electric motor 1 (also called a molded electric motor) includes a rotor 2 (also called a rotor assembly), the stator assembly 3 (also called a molded stator), a plurality of heat sinks 5 as heat dissipation members, and bearings 7a and 7b. In the example illustrated in FIG. 1, the electric motor 1 also includes a bracket 8 and a waterproof rubber 9 for sealing the electric motor 1. The electric motor 1 is, for example, a permanent magnet synchronous motor, but is not limited to this type. The bearings 7a and 7b rotatably support both ends of the shaft 22 of the rotor 2.

The rotor 2 includes a rotor iron core 21 and the shaft 22. The rotor 2 is rotatable on a rotation shaft (axis A1).

The rotor 2 is rotatably disposed inside the stator assembly 3 (specifically, a stator 30) with a gap in between. The rotor 2 may also include a permanent magnet for forming a magnetic pole of the rotor 2.

The stator assembly 3 includes the stator 30, a printed board 4, a lead wire 41 connected to the printed board 4, a driving circuit 42 fixed to a surface of the printed board 4, and the resin 6.

Figure 4:
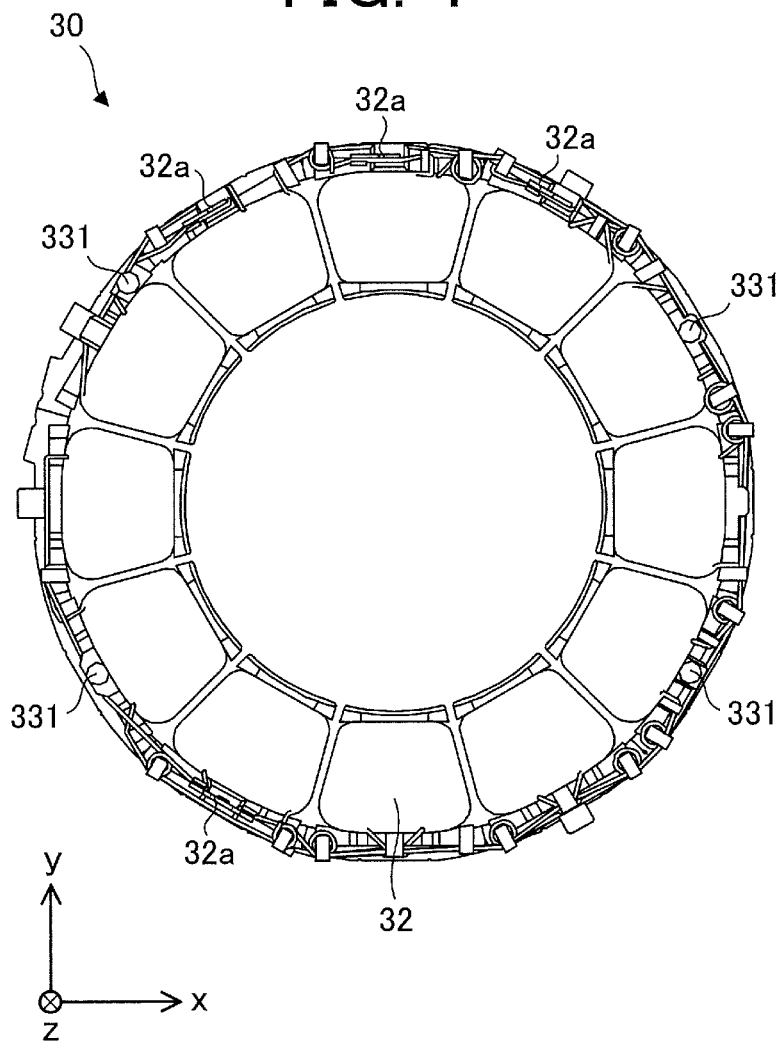
FIG. 4 is a front view schematically illustrating a structure of a stator.

FIG. 4 is a front view schematically illustrating a structure of the stator 30.

Figure 5:
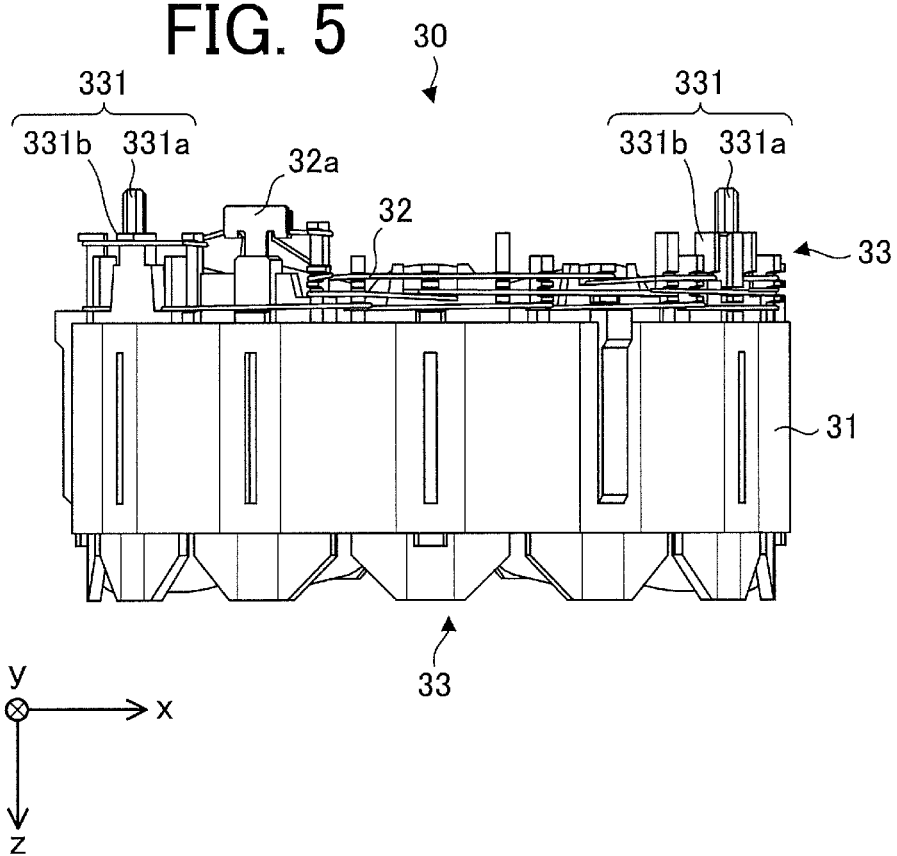
FIG. 5 is a side view schematically illustrating the structure of the stator.

FIG. 5 is a side view schematically illustrating the structure of the stator 30.

The stator 30 includes a stator iron core 31 in which a plurality of electromagnetic steel sheets are stacked in the axial direction, a winding 32 (also called a stator winding), an insulator 33 as an insulating part. Each of the plurality of electromagnetic steel sheets is formed in a predetermined shape by punching, and the resulting electromagnetic steel sheets are fixed to each other by caulking, welding, bonding or the like.

The winding 32 is, for example, a magnet wire. The winding 32 is wound around the insulator 33 combined with the stator iron core 31, and thus a coil is formed. The winding 32 is electrically connected to a terminal 32a (winding terminal). In the example illustrated in FIG. 5, an end of the winding 32 is caught on a hook portion of the terminal 32a, and is fixed to the terminal 32a by fusing, soldering or the like. The terminal 32a is fixed to the insulator 33, and is electrically connected to the printed board 4.

The insulator 33 includes at least one fixing portion 331 for fixing the printed board 4. The insulator 33 is, for example, a thermoplastic resin such as polybutylene terephthalate (PBT). The insulator 33 electrically insulates the stator iron core 31 (e.g., teeth of the stator iron core 31). The insulator 33 is integrally formed with the stator iron core 31, for example. The insulator 33 may be previously molded, and the molded insulator 33 may be combined with the stator iron core 31.

The printed board 4 has positioning holes 43 (also called simply as "holes") that are engaged with fixing portions 331 (specifically, projections 331a) of the insulator 33.

Each of the fixing portions 331 of the insulator 33 includes a projection 331a and a support portion 331b. The projections 331a are inserted in the positioning holes 43 formed in the printed board 4 (FIG. 3). Accordingly, the printed board 4 is fixed to the insulator 33. The support portions 331b support the printed board 4 in the axial direction, and position the printed board 4 in the axial direction.

The printed board 4 and the stator 30 are united with the resin 6 (FIG. 1). The driving circuit 42 controls rotation of the rotor 2. The driving circuit 42 includes, for example, a driving device 42a and a Hall integrated circuit (IC) 42b.

The driving device 42a is, for example, a power transistor. The driving device 42a is electrically connected to the winding 32, and supplies the winding 32 with a driving current based on a current supplied from the outside or the inside (e.g., a battery) of the electric motor 1. In this manner, the driving device 42a controls rotation of the rotor 2.

For example, the Hall IC 42b detects a magnetic field from the rotor 2, thereby detecting a rotation position of the rotor 2.

The resin 6 is a thermosetting resin such as a bulk molding compound (BMC). The BMC enables low-pressure molding, and thus, is suitable for insert molding. Accordingly, it is possible to prevent deformation of an inserted object such as the printed board 4 or the stator 30 in molding the resin 6 with a die, and thus quality of the electric motor 1 can be enhanced.

The resin 6 includes a heat sink fixing portion 61 for fixing the heat sinks 5 (FIG. 1). The heat sink fixing portion 61 is a hole, for example. The resin 6 may be a thermoplastic resin such as polyphenylene sulfide (PPS). PPS is superior to BMC in thermal conductivity, and thus heat of the stator assembly 3 is easily transferred to the heat sinks 5.

Accordingly, heat dissipation performance of the electric motor 1 is enhanced, and thus a temperature rise in the printed board 4 and the winding 32 can be prevented.

The heat sinks 5 are made of, for example, aluminium such as A6063. In the example illustrated in FIG. 2, the shape of each heat sink 5 (specifically, a planar shape on the xy plane) is a rectangle. Each heat sink 5 is fixed to the stator assembly 3 and releases heat of the stator assembly 3 (e.g., heat generated by the stator 30 or the driving circuit 42) to the outside of the electric motor 1. A part of the heat sink 5 (e.g., fins 51 illustrated in FIG. 2) is exposed to the outside of the resin 6. Accordingly, heat generated by the stator assembly 3 is released to the outside of the electric motor 1.

In this embodiment, the plurality of heat sinks 5 are radially arranged from the rotation center of the rotor 2 (axis A1), on one end side of the electric motor 1 in the axial direction. In this embodiment, the plurality of heat sinks 5 are fixed to the one end side of the electric motor 1 in the axial direction, but the plurality of heat sinks 5 may be attached to the outer peripheral surface of the stator assembly 3.

The heat sinks 5 may be in contact with the printed board 4. In the case where the heat sinks 5 are in contact with the printed board 4, heat from the printed board 4 can be efficiently released to the outside of the electric motor 1.

Figure 6A:
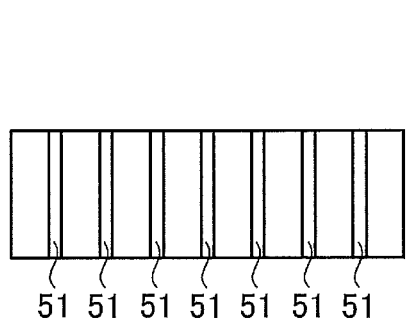
FIG. 6A is a plan view schematically illustrating an example of an heat sink.
Figure 6B:
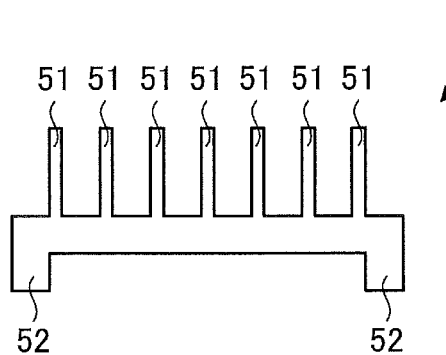
FIG. 6B is a side view schematically illustrating the example of the heat sink.

FIG. 6A is a plan view schematically illustrating an example of the heat sink 5, and FIG. 6B is a side view schematically illustrating an example of the heat sink 5.

Each of the plurality of heat sinks 5 includes the plurality of fins 51 (heat dissipation fins), and press fitting portions 52 that are engaged with the stator assembly 3 (e.g., the resin 6). The press fitting portions 52 are press fitted in the heat sink fixing portions 61 of the resin 6, for example. Accordingly, the heat sinks 5 are fixed to the resin 6.

In the example illustrated in FIG. 2, each of the fins 51 extends in the radial direction of the stator assembly 3. That is, in the example illustrated in FIG. 2, each heat sink 5 is disposed such that each of the fins 51 extends in the radial direction.

The plurality of heat sinks 5 may be made of different materials and may have different structures.

In the example illustrated in FIG. 1, the press fitting portions 52 are engaged with the resin 6, and thus a positioning shift can be prevented. In addition, since the press fitting portions 52 are engaged with the resin 6, it is possible to prevent the heat sinks 5 from coming off the electric motor 1.

First Variation

Figure 7A:
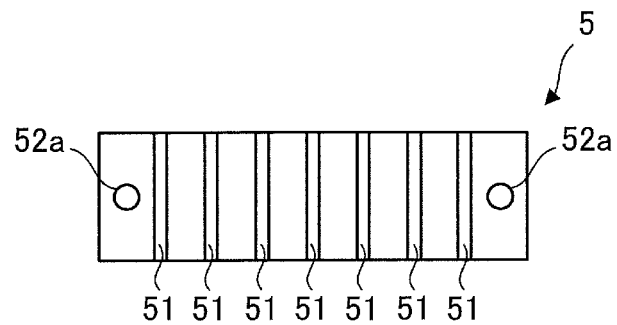
FIG. 7A is a plan view schematically illustrating another example of the heat sink.
Figure 7B:
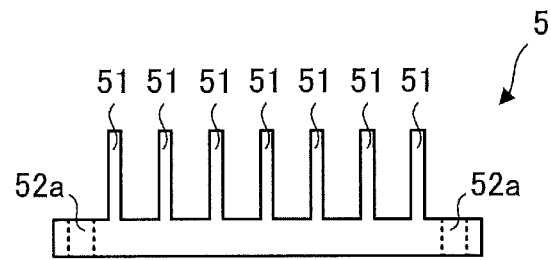
FIG. 7B is a side view schematically illustrating another example of the heat sink.

FIG. 7A is a plan view schematically illustrating another example of the heat sink 5, and FIG. 7B is a side view schematically illustrating another example of the heat sink 5.

As illustrated in FIGS. 7A and 7B, each heat sink 5 may include attachment holes 52a (also called simply as "holes") that engages with the fixing portions 331 (specifically, the projections 331a) of the insulator 33, instead of the press fitting portions 52. For example, the projections 331a are inserted in the attachment holes 52a, and the projections 331a projecting from the attachment holes 52a can be fixed to the heat sinks 5 by heat welding or ultrasonic welding, for example. In this manner, the heat sinks 5 can be fixed to the stator assembly 3 without a fixing member such as a screw. Thus, the number of parts of the electric motor 1 and production process of the electric motor 1 can be reduced, and thus costs for the electric motor 1 can be reduced.

The heat sinks 5 illustrated in FIGS. 7A and 7B may be fixed to the stator assembly 3 with screws (e.g., self-tapping screws) or bolts. In this case, the stator assembly 3 has screw holes. In the case of using self-tapping screws, nuts are unnecessary, and the number of parts can be reduced.

Second Variation

Figure 8:
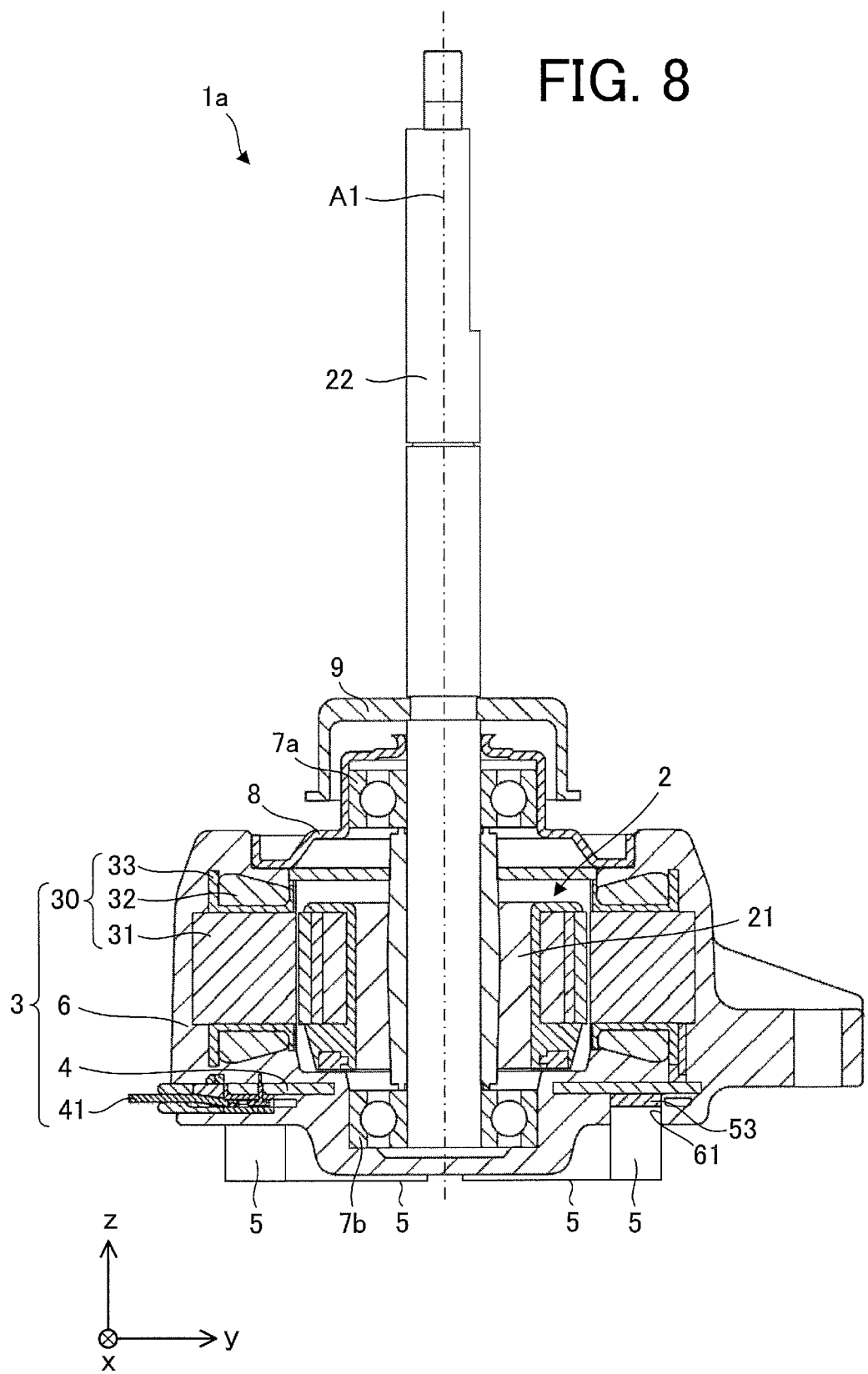
FIG. 8 is a cross-sectional view schematically illustrating a structure of an electric motor according to a second variation including a heat dissipation assist member.

FIG. 8 is a cross-sectional view schematically illustrating a structure of an electric motor 1a according to a second variation including a heat dissipation assist member 53.

The electric motor 1a according to the second variation includes at least one heat dissipation assist member 53, and the other components are the same as that of the electric motor 1 according to the first embodiment. The heat dissipation assist member 53 is disposed between at least one heat sink 5 and the stator assembly 3. The heat dissipation assist member 53 transfers heat of the stator assembly 3 to the heat sink 5. The heat dissipation assist member 53 can be formed in a sheet shape or a block shape, for example. The heat dissipation assist member 53 preferably has adhesion. The heat dissipation assist member 53 is disposed between the heat sink 5 and the stator assembly 3, and thus adhesion between the heat sink 5 and the stator assembly 3 increases and consequently heat dissipation performance can be enhanced.

Third Variation

Figure 9:
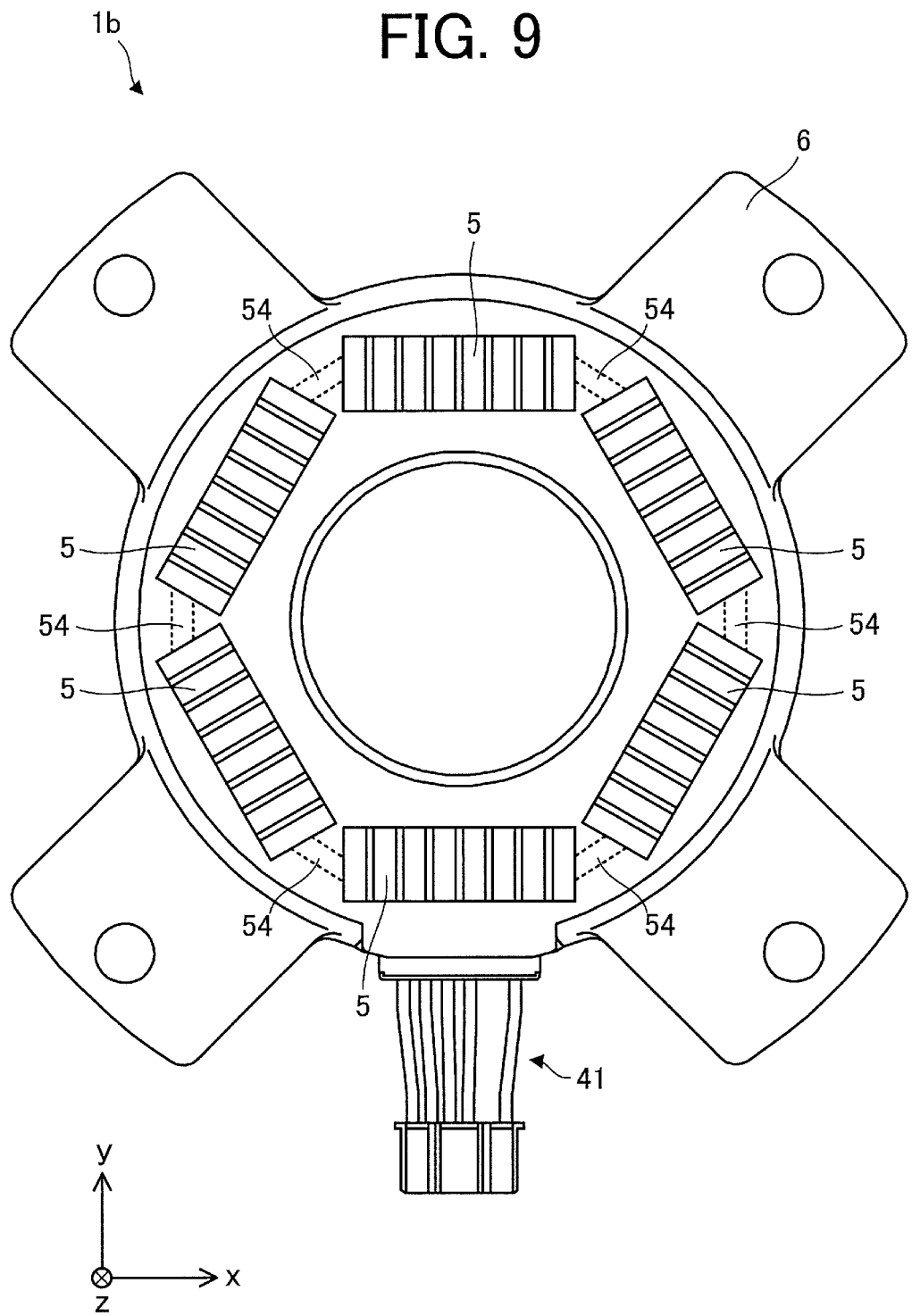
FIG. 9 is a front view schematically illustrating a structure of an electric motor according to a third variation.

FIG. 9 is a front view schematically illustrating a structure of an electric motor 1b according to a third variation.

The electric motor 1b according to the third variation includes a plurality of coupling members 54, and the other components are the same as that of the electric motor 1 according to the first embodiment. Each of the coupling members 54 couples two heat sinks 5 adjacent to each other in the circumferential direction. For example, each of the coupling members 54 has a recess or the like for fixing the heat sinks 5. The coupling members 54 are made of, for example, a resin. A material for the coupling members 54 is not limited to the resin. In the production process of the electric motor 1b, when the plurality of heat sinks 5 are previously coupled by the coupling members 54, the plurality of heat sinks 5 can be attached to the stator assembly 3 at a time. Accordingly, production costs for the electric motor 1b can be reduced.

Fourth Variation

Figure 10:
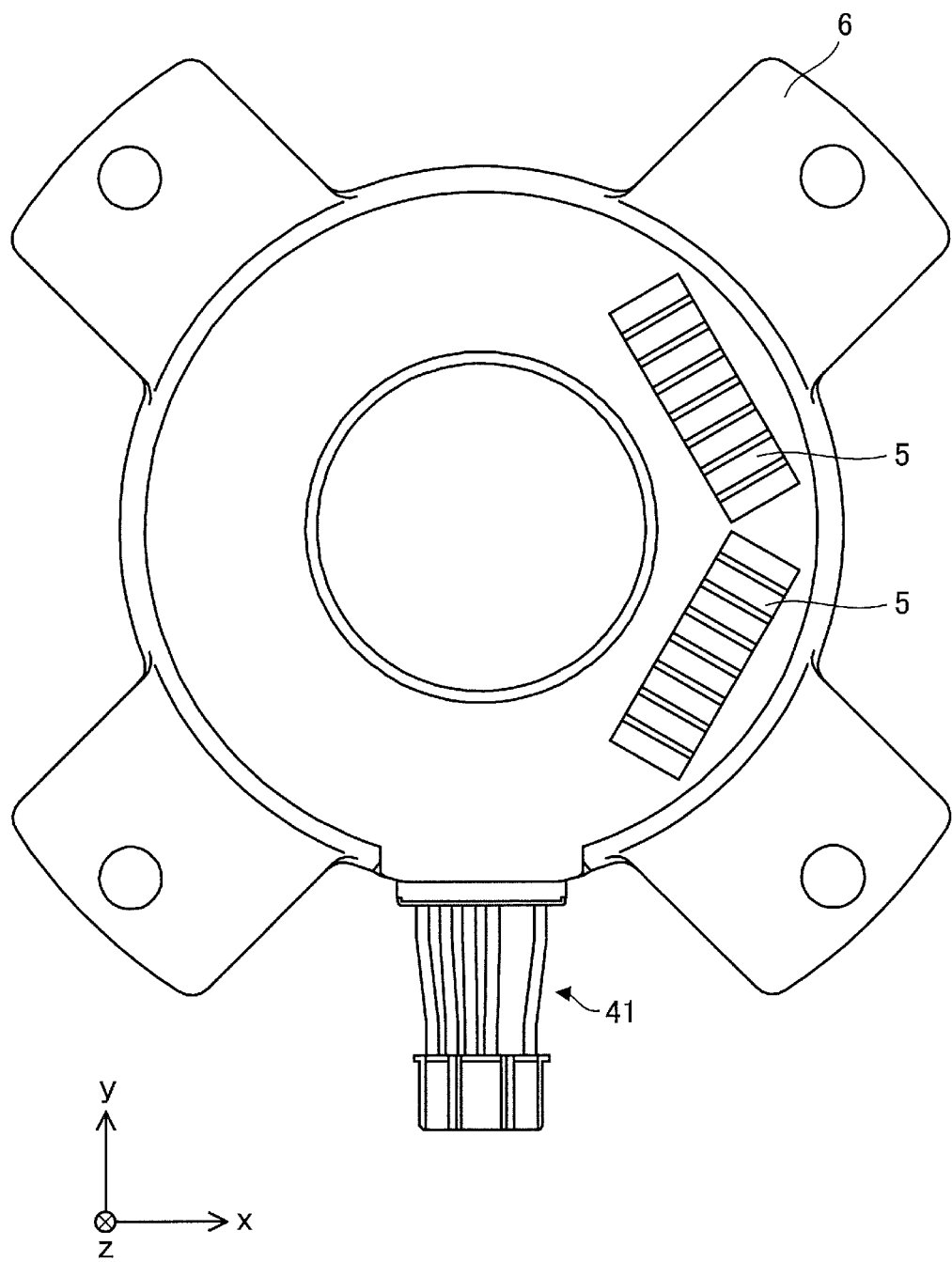
FIG. 10 is a front view schematically illustrating a structure of an electric motor according to a fourth variation.

FIG. 10 is a front view schematically illustrating a structure of an electric motor 1c according to a fourth variation.

The electric motor 1c according to the fourth variation is different from the electric motor 1 according to the first embodiment in arrangement of the plurality of heat sinks 5 (two heat sinks 5 in the fourth variation), and the other components are the same as that of the electric motor 1 according to the first embodiment. As illustrated in FIG. 10, the plurality of heat sinks 5 may be concentrated near a part that generates a large amount of heat (e.g., at a position opposing the driving circuit 42). Accordingly, heat from a specific part of the electric motor 1c can be efficiently released to the outside. In addition, by disposing the heat sinks 5 only near a specific part of the electric motor 1c, costs for electric motor 1c can be reduced.

Fifth Variation

Figure 11:
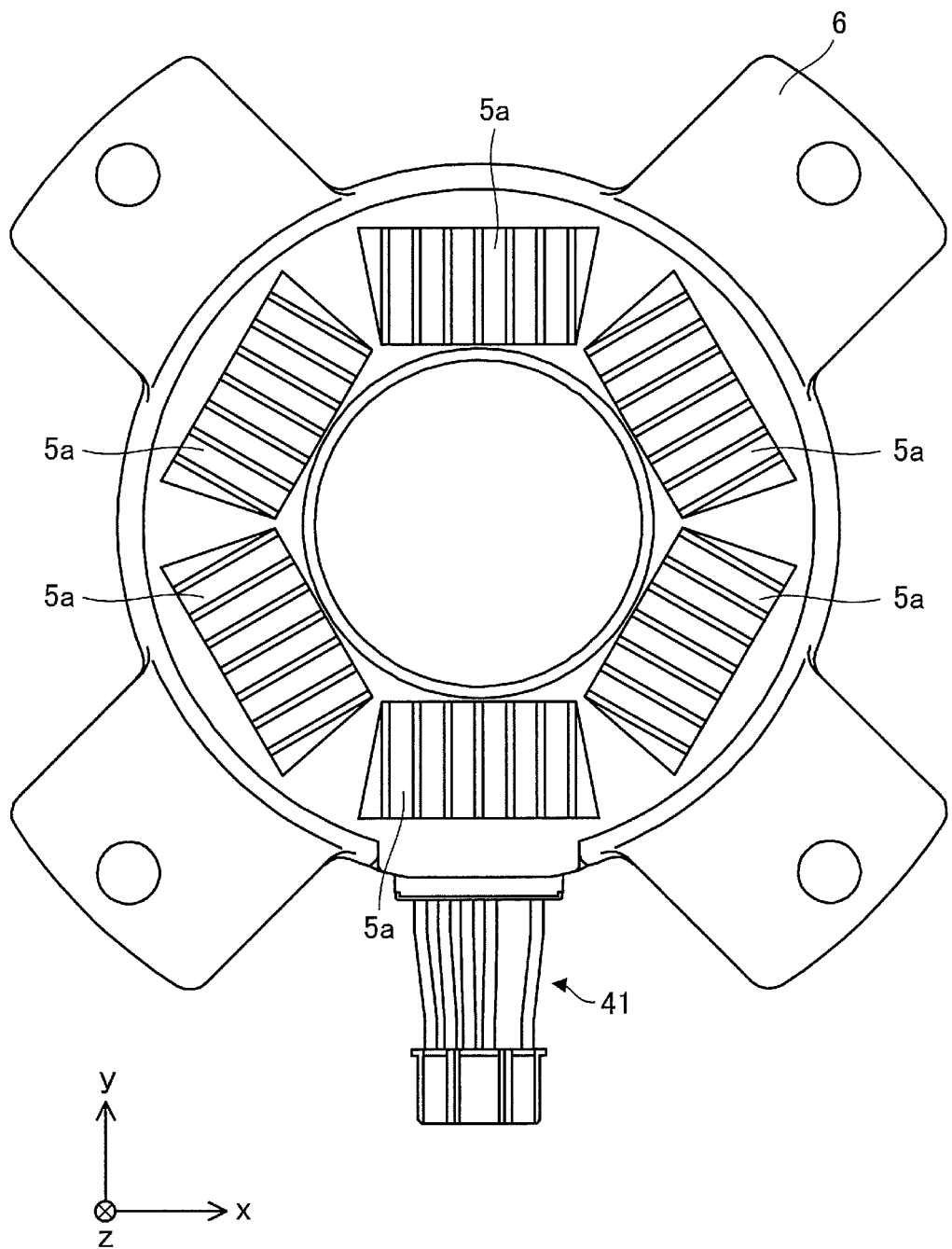
FIG. 11 is a front view schematically illustrating a structure of an electric motor according to a fifth variation.

FIG. 11 is a front view schematically illustrating a structure of an electric motor 1d according to a fifth variation.

In the electric motor 1d according to the fifth variation, the shape of a heat sink 5a as a heat dissipation member is different from the shape of the heat sink 5 of the electric motor 1 according to the first embodiment, and the other components are the same as that of the electric motor 1 according to the first embodiment. The shape of the heat sink 5a (specifically, a planar shape on the xy plane) is a trapezoid.

Sixth Variation

Figure 12:
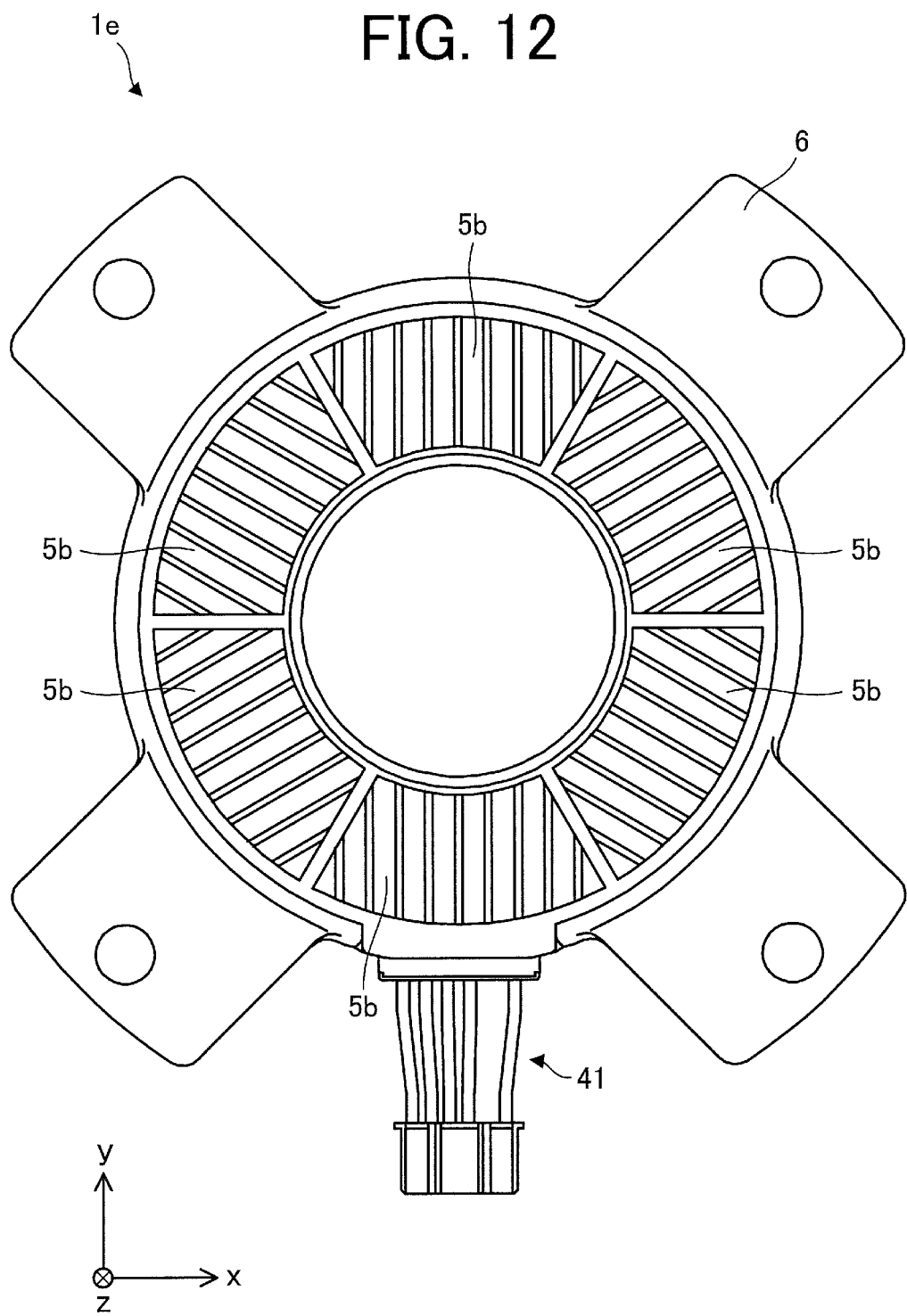
FIG. 12 is a front view schematically illustrating a structure of an electric motor according to a sixth variation.

FIG. 12 is a front view schematically illustrating a structure of an electric motor 1e according to a sixth variation.

In the electric motor 1e according to the sixth variation, the shape of a heat sink 5b as a heat dissipation member is different from the shape of the heat sink 5 of the electric motor 1 according to the first embodiment, and the other components are the same as that of the electric motor 1 according to the first embodiment. The shape of the heat sink 5b (specifically, a planar shape on the xy plane) is a fan shape.

Seventh Variation

Figure 13:
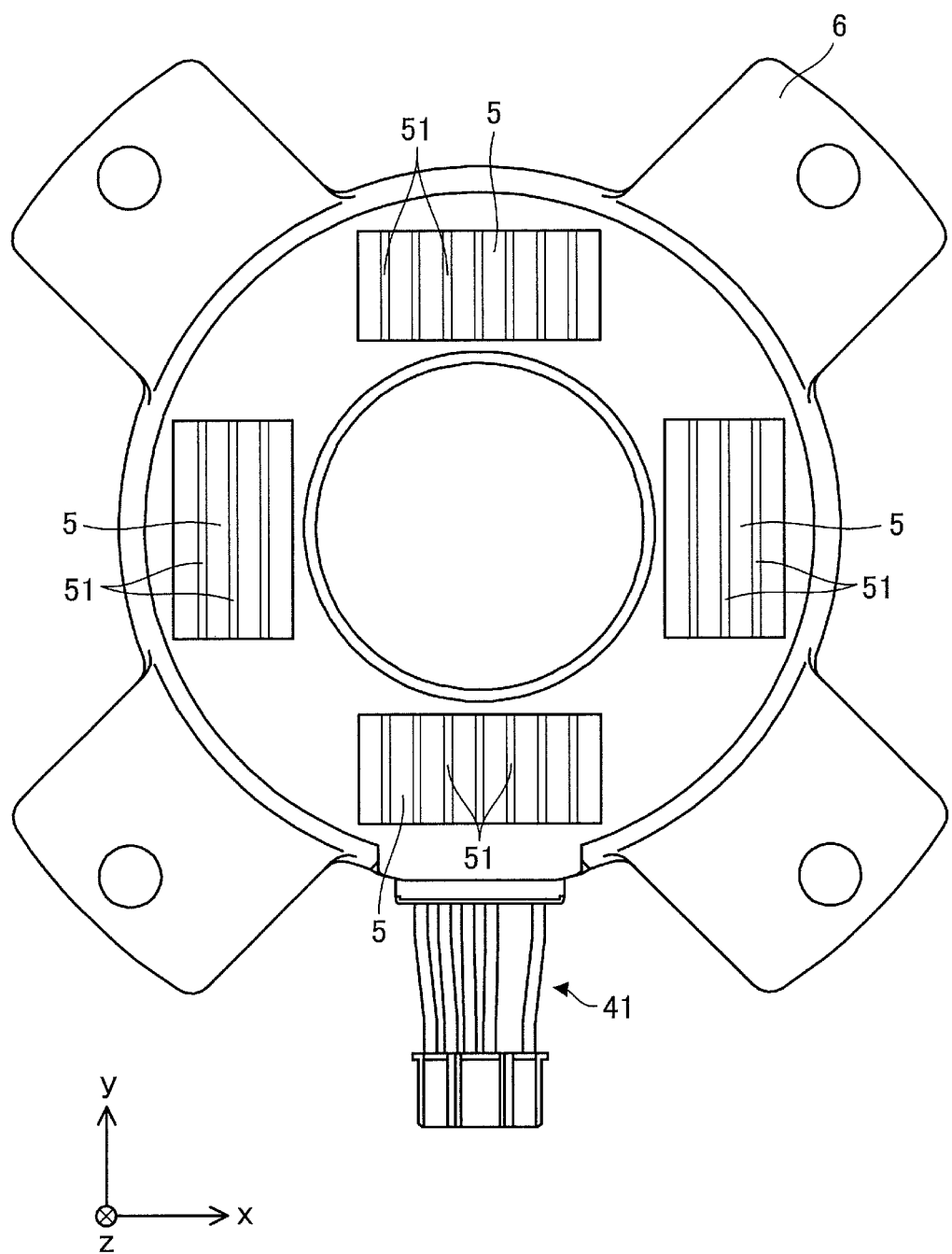
FIG. 13 is a front view schematically illustrating a structure of an electric motor according to a seventh variation.

FIG. 13 is a front view schematically illustrating a structure of an electric motor 1f according to a seventh variation.

The electric motor 1f according to the seventh variation is different from the electric motor 1 according to the first embodiment in arrangement of the heat sinks 5, and the other components are the same as that of the electric motor 1 according to the first embodiment.

In the electric motor 1f, the heat sinks 5 are arranged such that fins 51 of the plurality of heat sinks 5 are oriented in the same direction (i.e., in one direction). For example, the heat sinks 5 are arranged such that a first fin (fin 51) of the heat sink 5 as a first heat dissipation member is oriented in the same direction as a second fin (fin 51) of the heat sink 5 as a second heat dissipation member different from the first heat dissipation member.

In the example illustrated in FIG. 13, the heat sinks 5 are arranged such that the fins of the heat sinks 5 extend in the vertical direction (y-axis direction in FIG. 13) while the electric motor 1f is used. Accordingly, heat of the electric motor 1f can be easily released upward through air passages formed by the fins 51.

An example of a method for producing the electric motor 1 will be described below.

Figure 14:
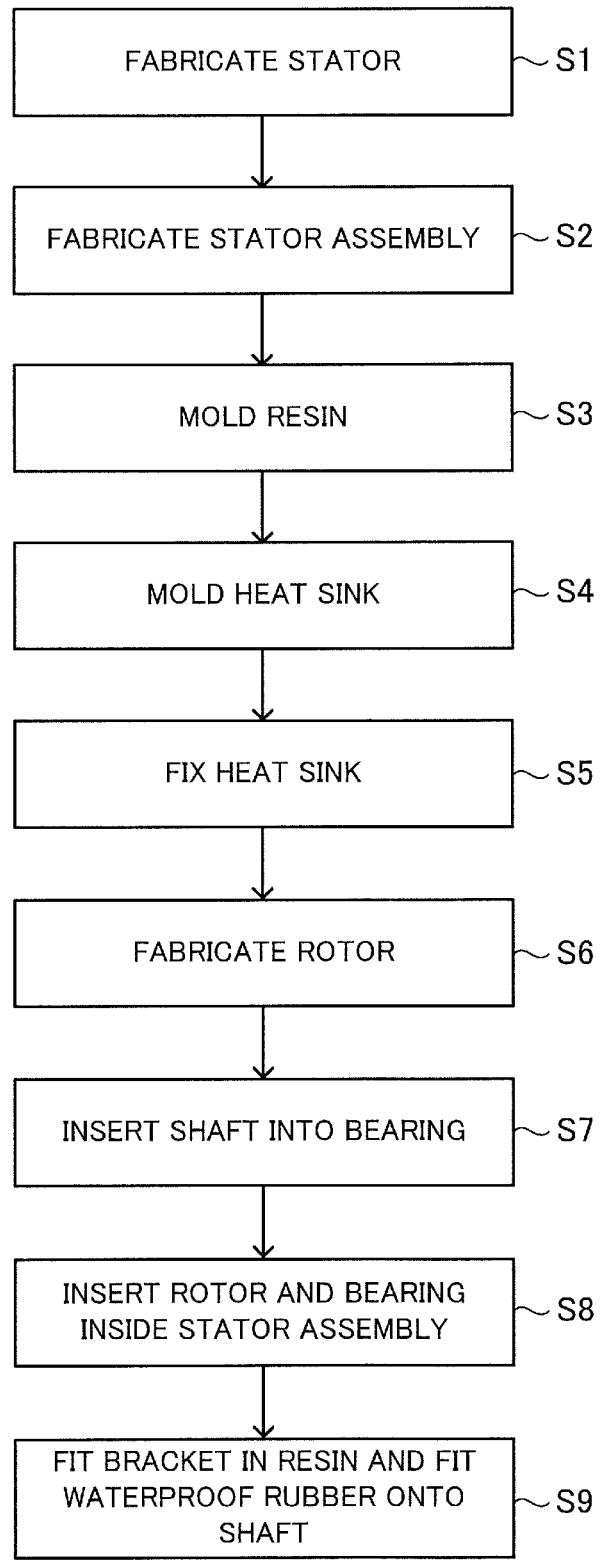
FIG. 14 is a flowchart showing an example of a production process of an electric motor.

FIG. 14 is a flowchart showing an example of a production process of the electric motor 1. The method for producing the electric motor 1 includes the following steps described below:

In step S1, the stator 30 is fabricated. For example, a plurality of electromagnetic steel sheets are stacked in the axial direction, thereby forming the stator iron core 31. The previously formed insulator 33 is attached to the stator iron core 31, and the winding 32 is wound around the stator iron core 31 and the insulator 33. In this manner, the stator 30 is obtained.

In step S2, the stator assembly 3 is fabricated. For example, projections 331a of the insulator 33 are inserted in positioning holes 43 of the printed board 4. In this case, the printed board 4 is pushed against support portions 331b. Accordingly, the printed board 4 is positioned, and the stator assembly 3 is obtained. The driving circuit 42 is previously fixed to a surface of the printed board 4. The lead wire 41 is also previously attached to the printed board 4. The projections 331a projecting from the positioning holes 43 may be fixed to the printed board 4 by heat welding, ultrasonic welding or the like.

In step S3, the stator 30 and the printed board 4 are united with the resin 6. For example, the stator 30 and the printed board 4 are placed in a die, and a material for the resin 6 (e.g., the thermosetting resin such as the bulk molding compound) is injected in the die. In molding the resin 6, the heat sink fixing portion 61 is also formed at the same time.

In step S4, the plurality of heat sinks 5 are molded. In this embodiment, the plurality of heat sinks 5 are molded by extrusion molding. The molding of the plurality of heat sinks 5 may be performed at the same time as the process in steps S1 through S3, or may be performed before step S1.

In step S5, the plurality of heat sinks 5 are fixed to the stator assembly 3. In this embodiment, the press fitting portions 52 of the heat sinks 5 are press fitted into the heat sink fixing portion 61 of the resin 6.

In step S6, the rotor 2 is fabricated. For example, the shaft 22 is inserted in a shaft hole formed in the rotor iron core 21, and the rotor 2 is obtained. Permanent magnets forming magnetic poles may be previously attached to the rotor iron core 21.

In step S7, the shaft 22 is inserted in the bearings 7a and 7b.

The order of step S1 through step S7 is not limited to the order shown in FIG. 14. For example, the steps from step S1 through step S5 may be performed in parallel with step S6. Step S6 may be performed before the steps from step S1 to step S5.

In step S8, the rotor 2 is inserted together with the bearings 7a and 7b inside the stator assembly 3 (specifically, the stator 30).

In step S9, the bracket 8 is fitted in the resin 6, and the waterproof rubber 9 is fitted onto the shaft 22.

Through the process described above, the electric motor 1 is assembled.

Advantages of the electric motor 1 according to the first embodiment (including advantages of the variations thereof) and advantages of the method for producing the electric motor 1 will be described below.

In the electric motor 1 according to the first embodiment, since the plurality of heat sinks 5 are fixed to the stator assembly 3, heat dissipation performance of the electric motor 1 can be enhanced.

The plurality of heat sinks 5 are radially arranged from the rotation shaft of the electric motor 1 (rotor 2), and thus an efficient path for dissipating heat can be formed. For example, in a case where the plurality of fins 51 radially extend, air passages can be radially formed. In this manner, heat of the electric motor 1 can be efficiently released to the outside.

In the conventional electric motor, since the one circular heat sink is attached to an end in the axial direction of the electric motor, it has been difficult to form air passages in consideration of the structure of the electric motor. On the other hand, in this embodiment, orientations of the fins 51 can be set in consideration of the structure of the electric motor 1. Thus, air passages with high heat dissipation performance can be set in consideration of the structure of the electric motor 1.

In a case where each of the heat sinks 5 is rectangular, the heat sinks 5 can be easily molded in production process of the heat sinks 5, and thus, processing costs can be reduced.

For example, in the case of molding using extrusion molding, a machining process after the molding can be reduced, and thus, fabricating costs for the heat sinks 5 can be reduced.

In addition, the press fitting portions 52 of the heat sinks 5 can be press fitted into the stator assembly 3 (e.g., the resin 6), and the heat sinks 5 can be fixed to the stator assembly 3 without a fixing member such as screws.

Accordingly, the number of parts of the electric motor 1 can be reduced, and costs for the electric motor 1 can be reduced.

As described in the first variation, in the case where the heat sinks 5 include the attachment holes 52a instead of the press fitting portions 52, the projections 331a are inserted in the attachment holes 52a, and the projections 331a projecting from the attachment holes 52a are fixed to the heat sinks 5 by heat welding or ultrasonic welding, for example. In this manner, the heat sinks 5 can be fixed to the stator assembly 3 without a fixing member such as a screw. Thus, the number of parts of the electric motor 1 and the production process of the electric motor 1 can be reduced, and thus costs for the electric motor 1 can be reduced.

In the electric motor 1a according to the second variation, when the heat dissipation assist member 53 is disposed between at least one heat sink 5 and the stator assembly 3, adhesion between the heat sink 5 and the stator assembly 3 increases and consequently heat dissipation performance can be enhanced.

In the electric motor 1b according to the third variation, when the plurality of heat sinks 5 are coupled to each other by the coupling members 54, the plurality of heat sinks 5 can be attached to the stator assembly 3 at a time. Accordingly, production costs for the electric motor 1b can be reduced.

In the electric motor 1c according to the fourth variation, the plurality of heat sinks 5 are concentrated near a part that generates a large amount of heat (e.g., at a position opposing the driving circuit 42). Accordingly, heat from a specific part of the electric motor 1c can be efficiently released to the outside. In addition, by disposing the heat sinks 5 only near a specific part of the electric motor 1c, costs for the electric motor 1c can be reduced.

As described in the fifth and sixth variations, the shape of each heat sink 5 is not limited to a circle as in a conventional heat sink. For example, the planar shape of each heat sink 5 may be a trapezoid or a fan shape. Therefore, the heat sink 5 having an appropriate shape can be used according to the location where the heat sinks 5 are arranged, and thus heat dissipation performance of the electric motor can be enhanced.

As described in the seventh variation, in the electric motor 1f, the fins 51 of the plurality of heat sinks 5 are oriented in the same direction. For example, when the electric motor 1f is used, the heat sinks 5 are disposed such that each of the fins 51 of the heat sinks 5 extends in the vertical direction. Accordingly, heat of the electric motor 1f can be easily released upward through air passages formed by the fins 51.

In the method for producing the electric motor 1 according to the first embodiment, the plurality of heat sinks 5 can be fabricated by extrusion molding, and thus the plurality of heat sinks 5 can be fabricated at low production costs. In addition, with the method for producing the electric motor 1, the heat sinks 5 can be arranged in consideration of the structure of the electric motor, and thus the electric motor 1 with enhanced heat dissipation performance can be produced.

In general, in molding or forging using a die cast, there are limitations on the height and the width of a fin and the pitch for a fin that can be formed, and molding failure such as voids easily occur. On the other hand, in this embodiment, since the heat sinks 5 are molded by using extrusion molding, molding can be performed in units of millimeters. For example, the heat sinks 5 can be molded such that the width of the fin is 2 mm or less, the height of the fin 51 is 10 mm or more, and the pitch for the fins 51 is 5 mm or less. That is, the use of extrusion molding can increase the height of the fins 51 and can narrow the pitch for the fins 51. As a result, the heat sinks 5 with high heat dissipation performance can be molded.

In addition, the use of the extrusion molding can mold a material having high thermal conductivity such as aluminum, for example, A6063, into small-sized and lightweight heat sinks 5.

For example, in a case where the shape of each heat sink 5 is a rectangle, the machine work after molding can be reduced, and thus production costs for the heat sinks 5 can be reduced.

Second Embodiment

An air conditioner 10 according to a second embodiment of the present invention will be described.

Figure 15:
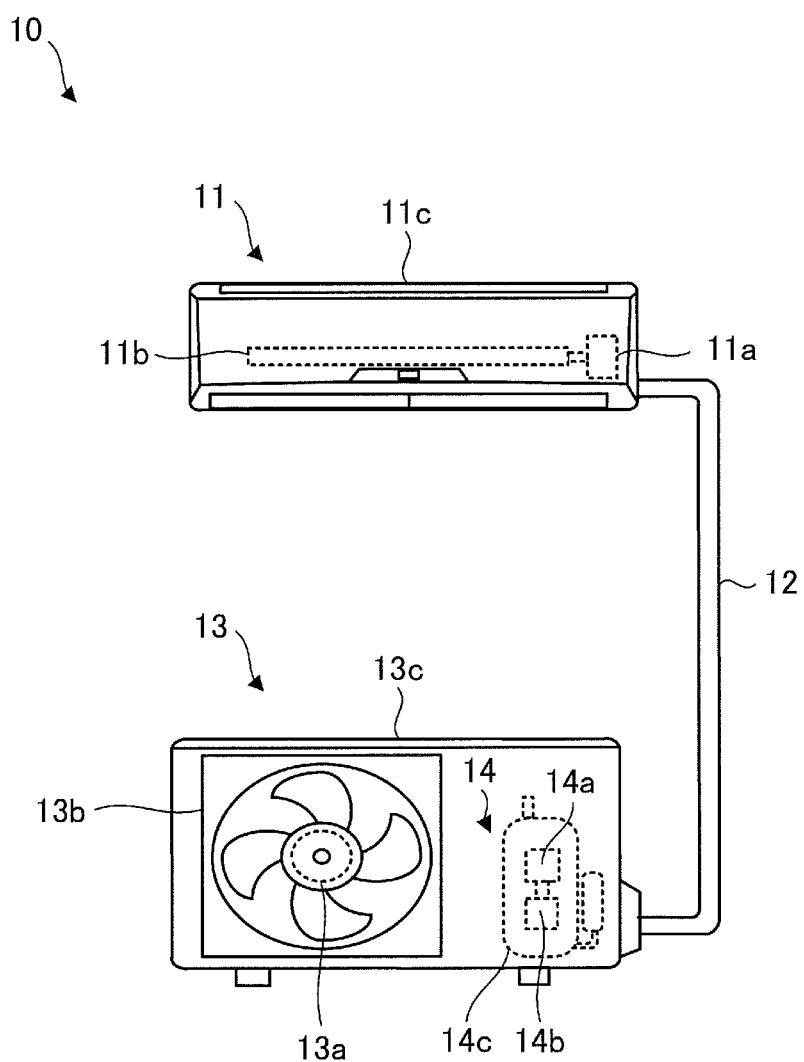
FIG. 15 is a diagram schematically illustrating a configuration of an air conditioner according to a second embodiment of the present invention.

FIG. 15 is a diagram schematically illustrating a configuration of the air conditioner 10 according to the second embodiment of the present invention.

The air conditioner 10 (e.g., a refrigerating air conditioner) according to the second embodiment includes an indoor unit 11 as an air blower (first air blower), a refrigerant pipe 12, an outdoor unit 13 as an air blower (second air blower) connected to the indoor unit 11 by the refrigerant pipe 12.

The indoor unit 11 includes an electric motor 11a (e.g., the electric motor 1 according to the first embodiment), an air blowing unit 11b that blows air when being driven by the electric motor 11a, and a housing 11c covering the electric motor 11a and the air blowing unit 11b. The air blowing unit 11b includes, for example, blades that are driven by the electric motor 11a.

The outdoor unit 13 includes an electric motor 13a (e.g., the electric motor 1 according to the first embodiment), an air blowing unit 13b, a compressor 14, and a heat exchanger (not shown). The air blowing unit 13b is driven by the electric motor 13a, thereby blowing air. The air blowing unit 13b includes, for example, blades that are driven by the electric motor 13a. The compressor 14 includes an electric motor 14a (e.g., the electric motor 1 according to the first embodiment), a compression mechanism 14b (e.g., a refrigerant circuit) that is driven by the electric motor 14a, and a housing 14c covering the electric motor 14a and the compression mechanism 14b.

In the air conditioner 10 according to the second embodiment, at least one of the indoor unit 11 or the outdoor unit 13 includes the electric motor 1 described in the first embodiment (including the variations thereof). In addition, the electric motor 1 described in the first embodiment is applied to at least one of the electric motors 11a or 13a as a driving source of an air blowing unit. In addition, as the electric motor 14a of the compressor 14, the electric motor 1 described in the first embodiment (including the variations thereof) may be used.

The air conditioner 10 can, for example, perform operations such as a cooling operation of sending cold air and a heating operation of sending warm air from the indoor unit 11. In the indoor unit 11, the electric motor 11a is a driving source for driving the air blowing unit 11b. The air blowing unit 11b can send conditioned air.

In the air conditioner 10 according to the second embodiment, the electric motor 1 described in the first embodiment (including the variations thereof) is applied to at least one of the electric motors 11a or 13a, and thus, advantages similar to those described in the first embodiment can be obtained. Accordingly, failure in the air conditioner 10 due to heat generation in the electric motor can be prevented. In addition, the use of the electric motor 1 described in the first embodiment in the air conditioner 10 can reduce costs for the air conditioner 10.

In addition, with the use of the electric motor 1 according to the first embodiment (including the variations thereof) as a driving source of the air blower (e.g., the indoor unit 11), advantages similar to those described in the first embodiment can be obtained. Accordingly, failure in the air blower due to heat generation in the electric motor can be prevented.

In addition, with the use of the electric motor 1 according to the first embodiment (including the variations thereof) as a driving source of the compressor 14, advantages similar to those described in the first embodiment can be obtained. Accordingly, failure in the compressor 14 due to heat generation in the electric motor can be prevented.

The electric motor 1 described in the first embodiment can be mounted on equipment including a driving source, such as a ventilator, a home appliance, or a machine tool, in addition to the air conditioner 10.

The features in the embodiments and the features in the variations described above can be combined as appropriate.

What is claimed is:

1. An electric motor comprising:
 a rotor;
 a plurality of heat dissipation members; and
 a stator assembly including a stator, a printed board, and a resin fixing the plurality of heat dissipation members, wherein
 the printed board is fixed to the stator without using a bolt, and the stator and the printed board are united with the resin,
 the plurality of heat dissipation members is provided on only one end side of the stator assembly in an axial direction of the electric motor,
 a part of the plurality of heat dissipation members is exposed to an outside of the resin,
 each of the plurality of heat dissipation members is engaged with the resin, and
 each of the plurality of heat dissipation members is spaced apart from and separated from the printed board by the resin.

2. The electric motor according to claim 1, wherein each of the plurality of heat dissipation members includes a plurality of heat dissipation fins each extending in a radial direction of the stator assembly.

3. The electric motor according to claim 1, wherein a first heat dissipation member of the plurality of heat dissipation members includes a first heat dissipation fin,
 a second heat dissipation member of the plurality of heat dissipation members includes a second heat dissipation fin, and
 the first heat dissipation fin and the second heat dissipation fin are oriented in an identical direction.

4. The electric motor according to claim 1, wherein a planar shape of each of the plurality of heat dissipation members is a rectangle, a trapezoid, or a fan shape.

5. The electric motor according to claim 1, wherein the plurality of heat dissipation members are radially arranged from a rotation center of the rotor, on one end side in the axial direction.

6. The electric motor according to claim 1, further comprising at least one heat dissipation assist member disposed between at least one heat dissipation member of the plurality of heat dissipation members and the stator assembly and to transfer heat of the stator assembly to the at least one heat dissipation member.

7. The electric motor according to claim 1, further comprising a coupling member coupling the plurality of heat dissipation members to one another.

8. An air conditioner comprising:
an indoor unit; and
an outdoor unit connected to the indoor unit, wherein
at least one of the indoor unit or the outdoor unit includes an electric motor, and
the electric motor includes
a rotor,
a plurality of heat dissipation members, and
a stator assembly including a stator, a printed board, and a resin fixing the plurality of heat dissipation members, wherein
the printed board is fixed to the stator without using a bolt, and the stator and the printed board are united with the resin,
the plurality of heat dissipation members is provided on only one end side of the stator assembly in an axial direction of the electric motor,
a part of the plurality of heat dissipation members is exposed to an outside of the resin,
each of the plurality of heat dissipation members is engaged with the resin, and
each of the plurality of heat dissipation members is spaced apart from and separated from the printed board by the resin.

9. A method for producing an electric motor including a rotor, a stator assembly including a stator, a printed board and a resin, and a plurality of heat dissipation members to release heat of the stator assembly, the method comprising:
fabricating the rotor;
fabricating the stator assembly;
fixing the printed board to the stator without using a bolt;
uniting the printed board and the stator with the resin;
inserting the rotor inside the stator assembly;
molding the plurality of heat dissipation members using extrusion molding; and
fixing each of the plurality of heat dissipation members to the resin of the stator assembly by engaging with the resin so that the plurality of heat dissipation members is provided on only one end side of the stator assembly in an axial direction of the electric motor, a part of the plurality of heat dissipation members is exposed to an outside of the resin, and each of the plurality of heat dissipation members is spaced apart from and separated from the printed board by the resin.

10. The air conditioner according to claim 8, wherein, in the electric motor,
each of the plurality of heat dissipation members includes a plurality of heat dissipation fins each extending in a radial direction of the stator assembly.

11. The air conditioner according to claim 8, wherein, in the electric motor,
a first heat dissipation member of the plurality of heat dissipation members includes a first heat dissipation fin,
a second heat dissipation member of the plurality of heat dissipation members includes a second heat dissipation fin, and
the first heat dissipation fin and the second heat dissipation fin are oriented in an identical direction.

12. The air conditioner according to claim 8, wherein, in the electric motor,
a planar shape of each of the plurality of heat dissipation members is a rectangle, a trapezoid, or a fan shape.

13. The air conditioner according to claim 8, wherein, in the electric motor, the plurality of heat dissipation members are radially arranged from a rotation center of the rotor, on one end side in the axial direction.

14. The air conditioner according to claim 8, the electric motor further comprising at least one heat dissipation assist member disposed between at least one heat dissipation member of the plurality of heat dissipation members and the stator assembly and to transfer heat of the stator assembly to the at least one heat dissipation member.

15. The air conditioner according to claim 8, the electric motor further comprising a coupling member coupling the plurality of heat dissipation members to one another.

16. The method according to claim 9, wherein
each of the plurality of heat dissipation members includes a plurality of heat dissipation fins each extending in a radial direction of the stator assembly.

17. The method according to claim 9, wherein
a first heat dissipation member of the plurality of heat dissipation members includes a first heat dissipation fin,
a second heat dissipation member of the plurality of heat dissipation members includes a second heat dissipation fin, and
the first heat dissipation fin and the second heat dissipation fin are oriented in an identical direction.

18. The method according to claim 9, wherein a planar shape of each of the plurality of heat dissipation members is a rectangle, a trapezoid, or a fan shape.

19. The method according to claim 9, wherein the plurality of heat dissipation members are radially arranged from a rotation center of the rotor, on one end side in the axial direction.

20. The method according to claim 9, wherein at least one heat dissipation assist member is disposed between at least one heat dissipation member of the plurality of heat dissipation members and the stator assembly and to transfer heat of the stator assembly to the at least one heat dissipation member.

* * * * *